United States Patent
Lapidous

(10) Patent No.: US 6,172,684 B1
(45) Date of Patent: Jan. 9, 2001

(54) METHOD AND APPARATUS FOR STORING DISPLAY LISTS OF 3D PRIMITIVES

(75) Inventor: Eugene Lapidous, Santa Clara, CA (US)

(73) Assignee: Silicon Engineering, Inc., Scotts Valley, CA (US)

( * ) Notice: Under 35 U.S.C. 154(b), the term of this patent shall be extended for 0 days.

(21) Appl. No.: 08/873,988

(22) Filed: Jun. 12, 1997

(51) Int. Cl.[7] .................................................. G06T 11/20
(52) U.S. Cl. ............................................................. 345/443
(58) Field of Search .................................. 345/443, 423, 345/419

(56) References Cited

U.S. PATENT DOCUMENTS

| | | | |
|---|---|---|---|
| 4,930,091 | * 5/1990 | Schroeder et al. | 345/433 |
| 5,572,634 | * 11/1996 | Duluk, Jr. | 345/419 |
| 5,581,673 | * 12/1996 | Kikuchi | 345/443 |

* cited by examiner

Primary Examiner—Mark Zimmerman
Assistant Examiner—Huedung X. Cao
(74) Attorney, Agent, or Firm—Blakely, Sokoloff, Taylor & Zaffman

(57) ABSTRACT

A method and apparatus for creating a display list permitting multiple states of the same type for a single primitive. By introducing a plurality of state variables of the same type in a predetermined order in a display list before a primitive description, different state variables of the same type are applied to different vertex descriptors of the primitive. In one embodiment, the state variables introduced are starting addresses of the groups of vertices addressable by vertex indices of the primitive. In a case where the primitive is a triangle, up to three different starting addresses might be introduced into the display list (one corresponding to each vertex of the triangle). By introducing multiple starting addresses, the vertex indices of the triangle description can be significantly shortened, the concern about variable length inputs can be eliminated, and each index is independent of its predecessor in the master display list. Moreover, these advantages can be achieved without significantly increasing the hardware complexity.

9 Claims, 4 Drawing Sheets

METHOD AND APPARATUS FOR STORING DISPLAY LISTS OF 3D PRIMITIVES

BACKGROUND OF THE INVENTION

(1) Field of the Invention

The invention relates to computer graphics. More specifically, the invention relates to storing display lists of three-dimensional primitives.

(2) Related Art

One of the well-known forms of storing data required for rendering of computer images is a display list. The display list contains a list of rendering primitives described by parameters of vertices of each primitive such as coordinates of the vertices in three-dimensional space, color intensity, texture maps, etc. (collectively, vertex data). Triangles are one of the most used primitives. Thus, for example, a display list will contain a number of triangle descriptions. In addition to triangle descriptions, the display list will typically contain one or more state variables one or more different types (blending mode, texture addressing mode, etc.). A state set by the variable of each type remains valid until changed by the next variable of the same type. When primitive is rendered, its rendering procedures are defined by the collection of current rendering states; each rendering state is set by a corresponding state variable in the display list before the primitive description. Commonly, a state variable is used for a large number of primitive descriptions. Existing systems permit only a single state variable of each type to be applied to any single primitive. For instance, blending mode is valid for the whole primitive described as a collection of vertex data.

In an effort to reduce the size of display lists particularly in view of the fact that vertices are often shared between triangles, the vertex data has been removed from the display list to its own vertex array. In such systems, the triangle description in the display list merely indexes into the vertex array, which then supplies the necessary vertex data to rendering hardware. Particularly when vertices are shared, this can result in a significant reduction of the space required to store vertex data and in the bus traffic from the main memory to the local video memory, where vertices can be stored for subsequent use by rendering hardware. In the best case, one instance of vertex data can be shared by two or more triangles. In such indexing, a tension exists between use of large and small indices. Particularly, the index must then be large enough to access the vertex array, and small enough not to require excessive space dedicated to store the triangle description which includes three descriptors, one for each vertex. In the prior art, a typical size for the indices (descriptors) is 16 bits, which permits addressing of 64K of vertices. FIG. 1 shows a prior art calculation of vertex array address from indices in a display list. A persistent state variable, starting address A1, is introduced into the display list followed by a triangle description consisting of three vertex indices V1–V3 of 16 bits each. By "persistent" state variable, it is meant that the state remains in effect until the state variable is replaced with a corresponding state variable. To access the vertex data stored in the vertex array, the 16-bit index multiplied by the size of the vertex data (Vsize) is added to the starting address to yield the vertex address. All three indices are used to index the single state allowing a maximum addressing range of 64K of vertices. Unfortunately, some sets of data may have more than 64K of vertices. For example, a well-defined human body will typically have more than 100K of vertices. Moreover, 16-bit indices requires 6 bytes per triangle to specify all three vertices. Thus, even if we assume only 50K vertices at 6 bytes per vertex, 300 kilo bytes are required to store the indexes. While the data size of a single vertex in the vertex array is 32 bytes and, thus, this prior art indexing reduces display list length over having the vertex data in the display list, it is still desirable to reduce further the display list size both because of negative system bus bandwidth effects and internal storage limitations imposed by long display lists.

While many prior art architectures render triangles based on the space on the screen it will occupy, some architectures employ what is known as chunking or tiling to break the screen into non-overlapping chunks which may be of relatively small size, for example, 32-by-32 pixels. Examples of such chunking architecture are Power VR created by NEC/Video Logic and Talisman created by Microsoft Corporation. This necessitates breaking the master display list into parts, i.e., for each chunk, a derivative display list is maintained that only retains the triangles intersecting that chunk. These derivative display lists are also required to maintain state coherency. Chunking provides a speed advantage because rendering small chunks can be done faster and uses a smaller z-buffer. However, because a triangle may intersect multiple chunks, it is necessary to repeat the triangle descriptions in the derivative display list of each chunk that triangle intersects. This duplication of triangle descriptions further increases the need to reduce the index size in the display list.

One way that prior art systems have attempted to reduce the space required to describe the geometry is to use the internal coherency and, rather than store the indices, such systems only store the differences between the adjacent indices. This reduces space because the difference between adjacent indices is likely to be small relative to the indices themselves which are likely to be 16 bits or even 24 bits in length. This works reasonably well with a master display list, but has two distinct disadvantages. The first disadvantage is common to all systems employing this technique. That is, while it may be relatively rare that the differences are greater than can be expressed in an allotted number of bits, it is nevertheless likely that at least in some cases it will occur. Therefore, the systems have to accommodate large and unknown differences. This is done using some sort of encoding such as Huffman encoding to handle variable length inputs. Handling variable length inputs substantially increases the complexity of the hardware. The second disadvantage is unique to chunking architectures. Specifically, if the index is based on history, breaking the master display list into derivative display lists will result in different codings of the same triangle in different display lists. This also necessitates that information about more than one predecessor be obtained for every triangle that appears in more than one display list, thus increasing bus traffic and coding complexity.

In view of the foregoing, it would be desirable to be able to decrease the size of the triangle description while maintaining or increasing the number of addressable vertices without increasing the complexity of the underlying rendering hardware.

BRIEF SUMMARY OF THE INVENTION

A method and apparatus for creating a display list permitting multiple states of the same type for a single primitive is disclosed. By introducing a plurality of state variables of the same type in a predetermined order in a display list before a primitive description, different state variables of the same type are applied to different vertex descriptors of the primitive. In one embodiment, the state variables introduced are starting addresses of the groups of vertices addressable by vertex indices of the primitive. In a case where the primitive is a triangle, up to three different starting addresses might be introduced into the display list (one corresponding to each vertex of the triangle). By introducing multiple starting addresses, the vertex indices of the triangle description can be significantly shortened, the concern about variable length inputs can be eliminated, and each index is independent of its predecessor in the master display list. Moreover, these advantages can be achieved without significantly increasing the hardware complexity.

DETAILED DESCRIPTION OF THE INVENTION

Figure 1:
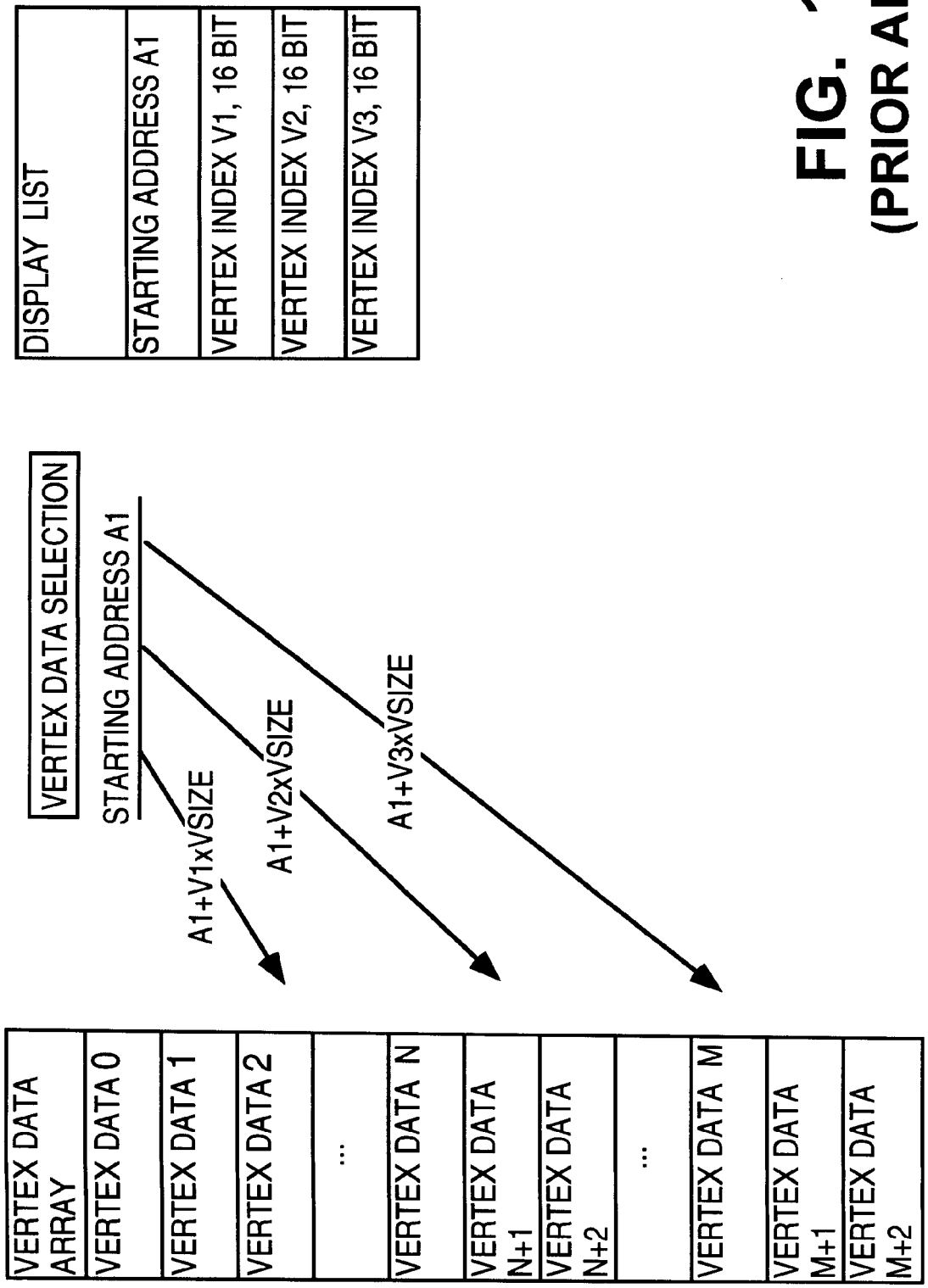
FIG. 1 shows a prior art calculation of vertex array address from indices in a display list.
Figure 2:
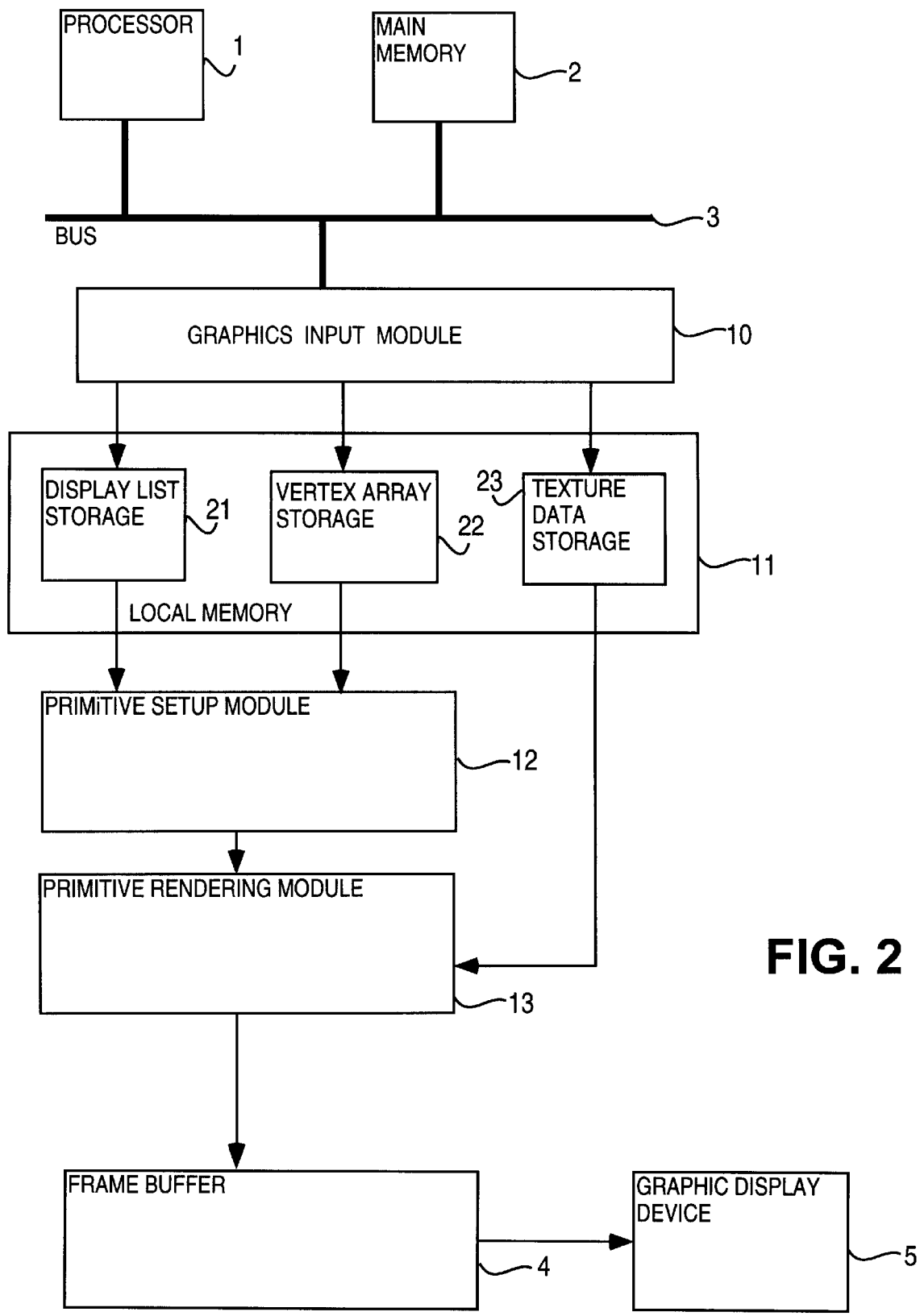
FIG. 2 is a block diagram of a system of one embodiment of the invention.

FIG. 2 is a block diagram of a system of one embodiment of the invention. A processor 1 and a main memory 2 are coupled to a bus 3. A graphic input module 10 is also coupled to the bus so it can communicate with processor 1 and/or main memory 2. The graphics input module 10 retrieves a display list from main memory 2 or accepts it from processor 1. The display list is comprised of state variables and primitive descriptions. The graphics input module 10 also accepts or retrieves a vertex array and texture data required for rendering of texture mapped primitives. The display list, vertex array, and texture data are stored in local memory 11 in separate locations, display list storage 21, vertex array storage 22, and texture data storage 23, respectively. The primitive setup module 12 is coupled to the local memory 11 and receives primitive descriptions from the display list storage area 21. The primitive setup module 12 uses one or more state variables with a single primitive description to calculate addresses in local memory where vertex data for a current primitive is stored. The primitive setup module 12 then retrieves the vertex data from vertex array storage 22 and local memory 11 and forwards the vertex data to the primitive rendering module 13. The primitive rendering module 13 accepts rendering parameters from the primitive setup module and accesses the textured data in the texture data storage 23 of local memory 11 to render an image of the triangle to a frame buffer 4 which is dedicated to storage of the image of a current frame. Once all primitives have been rendered and stored within the frame buffer 4, the then complete frame or chunk can be output to graphic display device 5 from the frame or chunk buffer 4.

Figure 3:
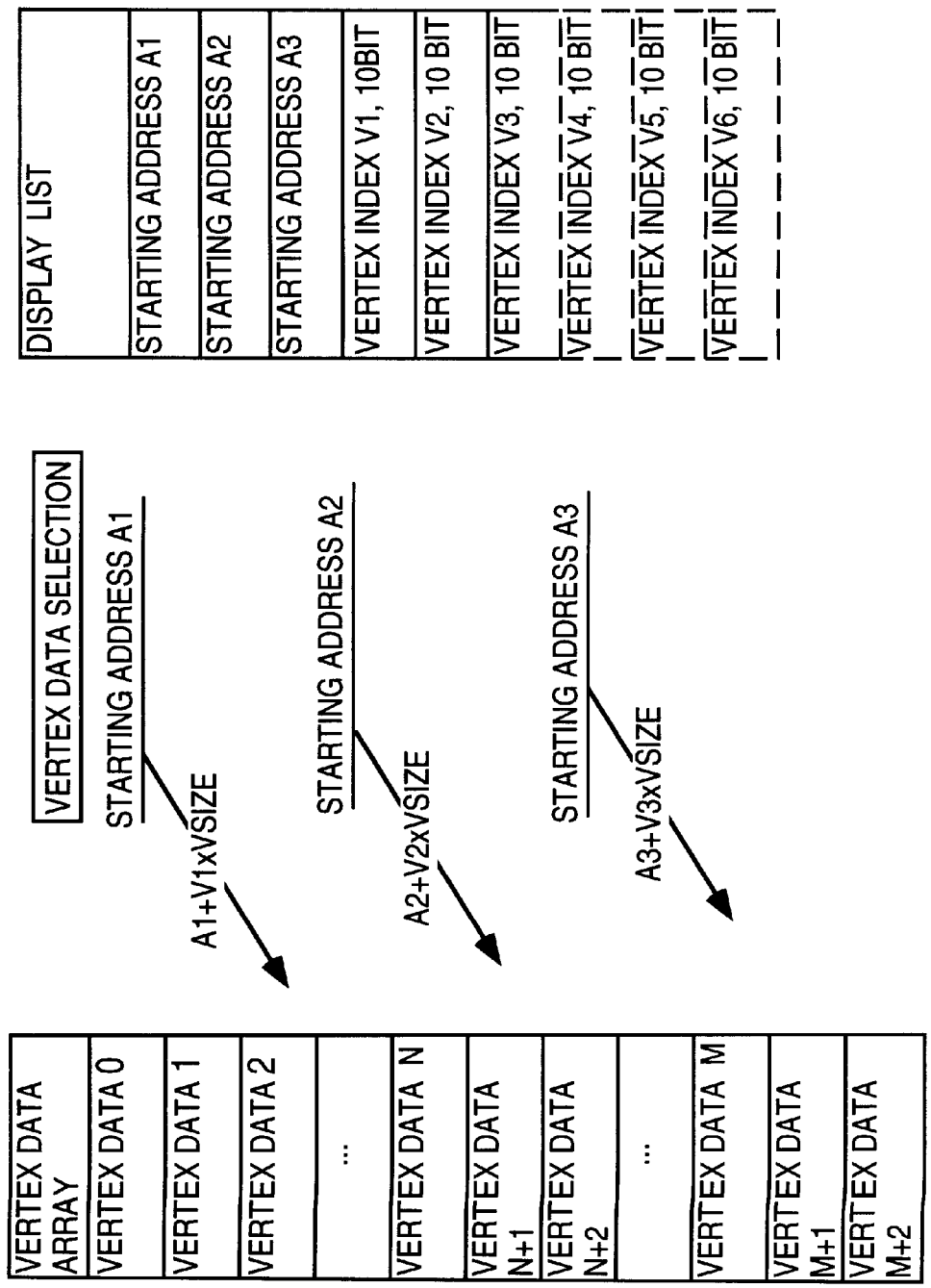
FIG. 3 shows one embodiment of the invention in which multiple states are introduced in the display list for a single primitive to calculate vertex addresses.

FIG. 3 is a diagram of the indexing of one embodiment of the invention in which multiple states may be introduced in the display list for a single primitive. In this case, the primitive is a triangle. The remainder of this description refers primarily to triangles because triangles are the most common primitive. However, the invention is readily expandable to other primitives, and such is within the scope and contemplation of the invention. As is described below, this association of multiple states of the same type with a single primitive permits a reduction in the primitive description size without concern for a need to accept variable size data, and thereby avoids necessitating the encoding used in the prior art to overcome the case where a large variance in adjacent vertex addresses causes the standard index size to be insufficient. It is expected that for most triangles, all vertices will be within a 10-bit range of a single starting address. Thus, this method results in a shorter display list while providing access to a greater number of vertices than possible in prior art systems having display lists of similar size.

In the embodiment of FIG. 3, starting address A1, starting address A2, and starting address A3 are state variables introduced for use in rendering a triangle defined by vertex data in vertex data array 22. The vertex data in vertex data array 22 corresponding to the triangle description is defined by 10-bit index of the vertex array having first element at the corresponding starting address. The triangle description is the 10-bit indices following starting address A3 in display list 21: vertex index V1, vertex index V2, and vertex index V3. Significantly, these three 10-bit values may be stored as single byte aligned 32-bit quantity with 2 bits unused. Then simple masking can be used to recover the desired vertex index. Vertex data selection is accomplished by adding the index, e.g., V1, multiplied by the vertex data size to the corresponding starting address, e.g., A1, to yield the address of the vertex data within the array.

In this embodiment, even if two vertices share the same starting address, e.g., A1 is equal to A2, three starting address entries will nevertheless be required as no way is provided to associate multiple vertices with a single starting address. However, it is expected that the display list will still be significantly shorter than prior art display lists because the primitive description has been reduced to a byte aligned 4 bytes from the 6 bytes required for 16-bit individual vertex index representations.

In this embodiment, the display list may contain multiple starting addresses of the group of vertices, followed by a triangle description as indices. If three starting addresses immediately precede the triangle description, the first starting address together with the first index is used to calculate a first vertex address; the second starting address together with the second index is used to calculate a second vertex; and the third starting address together with the third index is used to calculate a third vertex address. In this case, distance between vertex addresses in the same triangle can be arbitrarily large, while any particular triangle index itself remains small (here within 10 bits). Accordingly, an increase in size of the array of vertices addressable from a single triangle is realized. If a starting address of the group of vertices does not immediately precede a current triangle or only one starting address precedes a current triangle, computation of the vertex address is performed as in the prior art case using the same starting vertex address for all indices of the triangle. For example, if the next three entries in the display list are Vertex Index V4, V5, V6 (e.g., a second triangle description), the addreses into the vertex array would all be calculated from starting address A3.

As shown in this embodiment, decrease in size of the triangle description is accompanied by increase in number of states associated with it. An overall decrease of the size of display list results from the fact that a majority of triangles have indices with small differences between each other, so multiple vertex address are necessary only for the small fraction of all triangles.

For instance, consider a prior art embodiment with 16-bit indices and single 32-bit starting address that describes a list of 10,000 triangles. The overall size of this list is 16*3*10,000+32=480,032 bits or 60,004 bytes. In the above-described embodiment of the present invention, if indices of the triangles follow one another (triangle 1 addresses vertices 1, 2, 3; triangle 2 addresses vertices 4, 5, 6; etc.), the whole display list can be split into 4 groups. With an index field size for each triangle of 10 bits; 3 indices occupy 30 bits (32 bits for triangle description aligned with 32-bit boundary). Triangles at the edges of each group may need 3 states (starting addresses) to index from, but triangles inside each group use the last address (which is persistent) to index from. Therefore, the number of vertex addresses in this example is 12; size of the display list is 32*10,000+32*12= 320,384 bits or 40,048 bytes—less than 67% of the size of the same display list in the prior art embodiment It would be possible to further reduce the index to, e.g., 8 bits per vertex, however, at some point, the increased number of states in the display list outstrips the value to shorter descriptions. Nevertheless, indices shorter than 10 bits are considered within the scope and contemplation of the invention.

Figure 4:
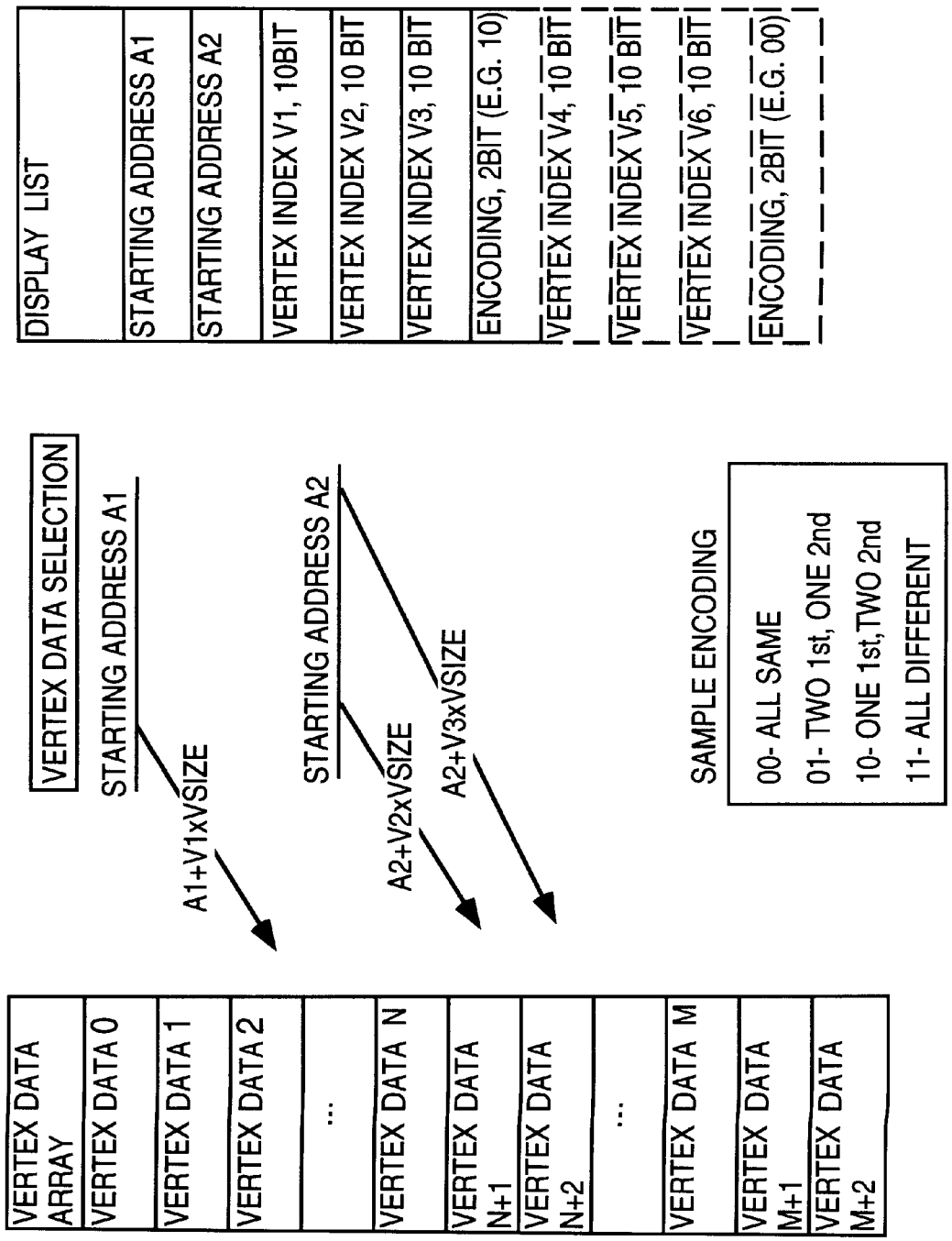
FIG. 4 shows an alternate embodiment in which a display list is used to calculate vertex addresses.

FIG. 4 shows an alternate embodiment in which a display list is used to calculate vertex array addresses. In this embodiment also, multiple starting addresses A1 and A2 precede three vertex indexes V1, V2, V3. Two bits that were left unused in the 32-bit aligned storage of the three 10-bit indices are used to encode from which address each vertex of a triangle is offset. In one possible encoding, "00" means all indices are offset from a single starting address. A "01" means first two vertexes are offset from the first starting address, and the remaining index is offset from a second starting address. A "10" indicates that a first vertex index is offset from the first starting address, while the second and third vertex indices are offset from the second starting address. Finally, an "11" indicates that each vertex index is offset from a different starting address. Other encodings are of course possible and within the scope and contemplation of the invention.

In this embodiment, as in the embodiment discussed in connection with FIG. 3, three, one or zero starting addresses can immediately precede triangle description. Code "00" is used if number of states immediately preceding triangle description is one or zero; code "11" is used if number of such states is three. However, while embodiment discussed in connection with FIG. 3 cannot be used with two starting addresses preceding triangle description (since no information exists to decide which starting address has to be used with 2 vertices), the embodiment discussed in connection with FIG. 4 presents this opportunity. In a case where two starting addresses immediately precede triangle description, code "01" is used to indicate that first vertex index is related to the first starting address, while two other indices are related to second address, while code "10" indicates that first and second vertex index are related to first starting address while third vertex index is related to the second starting address. This embodiment allows one to produce display lists of the smaller size (2 states can be used in some cases instead of 3) at the expense of some increase in complexity of hardware implementation (storing and interpretation of the codes).

As an example, referring to FIG. 4, if starting addresses A1 and A2 precede triangle description with vertex indices V1, V2, V3 and encoding "10", address of the first vertex is calculated as A1+V1 ×Vsize, address of the second vertex is A2+V2×Vsize, address of the third vertex is A2+V3×Vsize. If no starting addresses are immediately preceding next triangle description, as shown in FIG. 4, the last starting address A2 is used for all vertices of the triangle. It may be noted that codes "00" and "11" contain redundant information. In the case of three states preceding the triangle description, code "11" is assumed. While in case of one or zero states, code "00" is assumed. The 2-bit code in current embodiment is selected because two bits remain free in the 32-bit word with three 10-bit vertex indices. Redundant codes can be used for display list data verification. In other embodiments of the invention, two 1-bit codes can simultaneously refer to states of two different types preceding current triangle (for example, starting addresses and coordinate offsets).

Significantly, neither of the above-described embodiments of the invention rely on any predecessor in the display list. Moreover, because this method is based on index coherency, it will be effective in reducing the display list size of any display list which can be compressed on that basis. One embodiment of the invention requires only limited hardware modifications over existing systems. Specifically, the primitive setup module includes a counter of the number of states of the same type immediately preceding a current triangle and a state decoder that updates current state for each vertex descriptor if the number of states is more than one. Thus, hardware complexity is minimized.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system comprising:
   main memory;
   processor coupled to the memory;
   graphic input module coupled to the memory and the processor, the graphic input module having a local memory, the local memory for storing each of display lists, vertex data, and texture data in separate areas; and
   primitive setup module coupled to the local memory for receiving the display list instructions and calculating the location in local memory of a set of vertices corresponding to a current primitive, the display list instruction having a state for each vertex not within a maximum predetermined offset of a preceding vertex.

2. The system of claim 1 wherein the graphic input module acquires from one of the processor and the memory a display list, the display list having a first and a second state variable associated with a first descriptor and a second descriptor of a single primitive description.

3. The system of claim 2 wherein the primitive setup module applies each state variable to an associated descriptor.

4. An apparatus comprising:
   a display list creation unit which stores, in a display list, a first state variable from which a vertex address of a first vertex of a primitive is less than a maximum offset distant and stores a second state variable, in the display list, if a vertex address of a second vertex of the primitive is more than the maximum offset distant from the first vertex, the display list creation unit further storing indices of the first vertex and the second vertex; and
   an arithmetic unit which calculates the vertex address of each vertex of the primitive from a corresponding state variable and offset.

5. The apparatus of claim 4 further comprising:
a decoder which determines an association between a plurality of state variables in the display list and a plurality of indices constituting a primitive description.

6. The apparatus of claim 4 wherein the primitive is a triangle.

7. The apparatus of claim 6 wherein three starting addresses and a ten bit index for each vertex are stored in the display list if any vertex is offset by more than a ten bit value from a single starting address.

8. The apparatus of claim 7 wherein a last listed state variable is persistent.

9. The apparatus of claim 6 wherein two bits are used as an encoding to indicate how the offsets should be applied to a preceding set of three state variables and wherein the indices and the two-bit encoding are stored byte aligned as a thirty-two bit value.

* * * * *